(12) United States Patent
Sasada et al.

(10) Patent No.: US 8,118,498 B2
(45) Date of Patent: Feb. 21, 2012

(54) OPTICAL RECEPTACLE, OPTICAL MODULE, AND METHOD OF MANUFACTURING AN OPTICAL MODULE

(75) Inventors: Michihide Sasada, Yokosuka (JP); Yukitoshi Okamura, Maebaru (JP); Hiroshi Yamamoto, Inagi (JP)

(73) Assignee: Opnext Japan, Inc., Kanagawa (JP)

( * ) Notice: Subject to any disclaimer, the term of this patent is extended or adjusted under 35 U.S.C. 154(b) by 545 days.

(21) Appl. No.: 12/337,852

(22) Filed: Dec. 18, 2008

(65) Prior Publication Data
US 2009/0263082 A1 Oct. 22, 2009

(30) Foreign Application Priority Data
Dec. 28, 2007 (JP) .................................. 2007-341173

(51) Int. Cl.
*G02B 6/36* (2006.01)
(52) U.S. Cl. ................. 385/93; 385/88; 385/92; 385/94
(58) Field of Classification Search ...................... 385/93
See application file for complete search history.

(56) References Cited

U.S. PATENT DOCUMENTS

| | | | | |
|---|---|---|---|---|
| 5,963,694 A | * | 10/1999 | Fujimura et al. | 385/88 |
| 5,963,696 A | * | 10/1999 | Yoshida et al. | 385/91 |
| 6,179,483 B1 | * | 1/2001 | Kanazawa | 385/93 |
| 6,804,436 B2 | * | 10/2004 | Healy | 385/93 |
| 6,964,529 B2 | * | 11/2005 | Chien | 385/88 |
| 7,136,552 B2 | * | 11/2006 | Luo et al. | 385/35 |
| 7,325,984 B2 | * | 2/2008 | Nakanishi et al. | 385/93 |
| 7,517,158 B2 | * | 4/2009 | Fujimura et al. | 385/88 |

FOREIGN PATENT DOCUMENTS

| | | |
|---|---|---|
| JP | 59-048720 A | 3/1984 |
| JP | 60-166906 A | 8/1985 |
| JP | 61-85817 U | 6/1986 |
| JP | 08-122580 A | 5/1996 |
| JP | 09-101432 A | 4/1997 |
| JP | 10-096839 A | 4/1998 |
| JP | 10-274728 A | 10/1998 |
| JP | 2001-281501 A | 10/2001 |
| JP | 2003-014985 A | 1/2003 |
| JP | 2003-241031 A | 8/2003 |
| JP | 2005-148452 A | 6/2005 |
| JP | 2006-201392 A | 8/2006 |
| WO | WO 01/43245 A1 | 6/2001 |

OTHER PUBLICATIONS

Japanese Office Action in Japanese Patent Application No. 2007-341173, mailed Mar. 23, 2010.

* cited by examiner

*Primary Examiner* — Rhonda Peace
(74) *Attorney, Agent, or Firm* — Brundidge & Stanger, P.C.

(57) ABSTRACT

Provided are an optical receptacle capable of manufacturing an optical module thereby, while suppressing a manufacturing cost, preventing a quality degradation, and suppressing a quantity of returning light by reflection. In the optical receptacle, a recess for receiving a lens and a lens support and a through-hole penetrating from a bottom of the recess toward an exterior are formed, and the recess is formed so that an inner peripheral surface of the recess is fixed to a desired position with respect to an outer peripheral surface of the lens support, in a case where the lens and the lens support are received in the recess such that an optical axis of the lens and an optical axis of the optical fiber to be inserted into the through hole are deviated from each other.

8 Claims, 5 Drawing Sheets

OPTICAL RECEPTACLE, OPTICAL MODULE, AND METHOD OF MANUFACTURING AN OPTICAL MODULE

CROSS-REFERENCE TO RELATED APPLICATIONS

The present application claims priority from Japanese application JP 2007-341173 filed on Dec. 28, 2007, the content of which is hereby incorporated by reference into this application.

BACKGROUND OF THE INVENTION

1. Field of the Invention

The present invention relates to an optical receptacle, an optical module, and a method of manufacturing an optical module.

2. Description of the Related Art

In recent years, in accordance with a request for achieving a larger capacity and a cost reduction of an optical fiber communication system, a small-sized transmission/reception optical module, for example, a Small Form Factor Pluggable (SFP) module, is being manufactured. As an optical module to be mounted on such a small-sized transmission/reception optical module, there is one called as a CAN package in which a light receiving element and a signal amplifying IC are mounted on a disk-shaped metal plate called as a stem, and in which a lens barrel, which is provided with a condenser lens fixed to a tip end of the cylindrical metal lens barrel by using a low melting glass, or the like, is resistance-welded to the stem, thereby sealing the light receiving element, an IC, and the like inside the module. A member called as a receptacle is attached with respect to the CAN package, and a connector including an optical fiber is connected to the receptacle, whereby light is input from this optical fiber to the optical module.

In such an optical module, in a case where a quantity of reflection light, which is reflected on a light receiving element surface and returns to the optical fiber again, (return loss), is large, signal noise increases, resulting in being necessary to mount the optical module so as to reduce the quantity of returning light by reflection.

SUMMARY OF THE INVENTION

Figure 7:
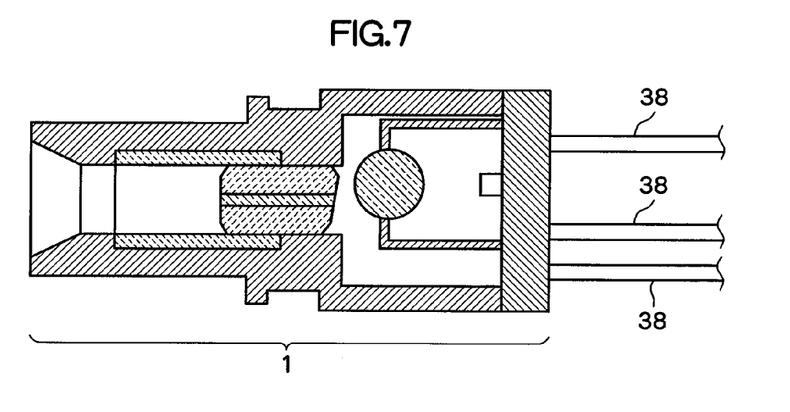
FIG. 7 is a sectional view illustrating an example of an optical module.

The light receiving element is arranged so as to be deviated from an optical axis of a lens, and the optical receptacle and the optical package such as a CAN package are fixed by bonding, as in the optical module 1 illustrated in FIG. 7. Thus, it is considered to mount the optical module so as to reduce the returning light by reflection.

However, in this case, it is necessary to arrange the optical fiber so as to be deviated from the optical axis of the lens, which causes a deviation in spaces to be filled with an adhesive for fixing by bonding the optical receptacle and the optical package to each other. Then, due to a difference in cure shrinkage caused by a difference in curing time between the adhesive in a thin filled portion and the adhesive in a thick filled portion, a stress is generated in the optical receptacle section, and the optical receptacle section moves, thus there is a fear in that a condensing point of the lens deviates. Further, a bonging strength of the thin filled portion of the adhesive may not sufficiently be kept, and due to, for example, a slight vibration and impact, there is a fear of the deviation of the optical receptacle. As described above, when the optical module 1 is mounted as illustrated in FIG. 7, there is a fear of quality deterioration.

Figure 8:
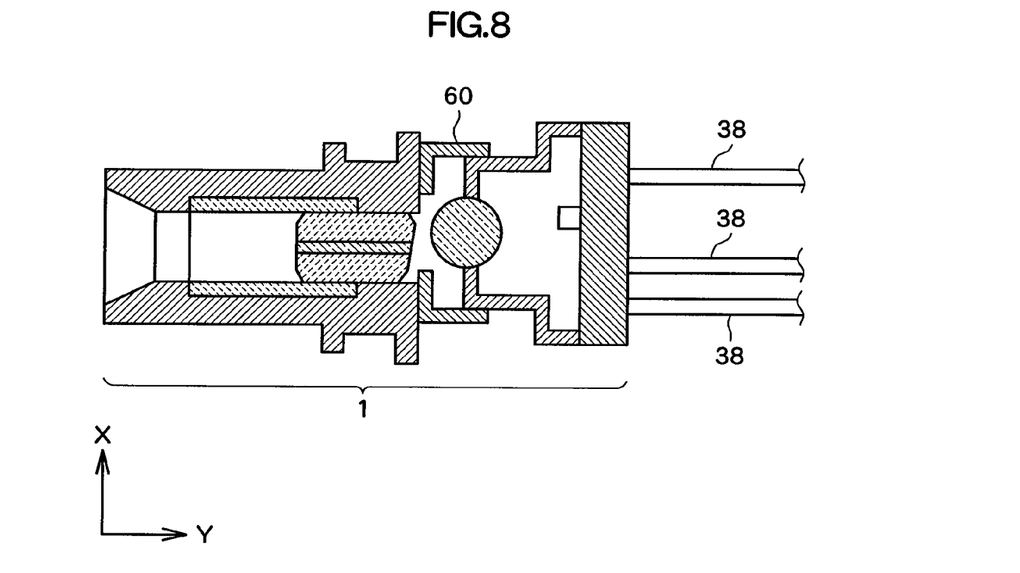
FIG. 8 is a sectional view illustrating an example of an optical module.

On the other hand, it is conceivable to reduce the returning light by reflection by mounting the optical module 1, as in the optical module 1 illustrated in FIG. 8, with use of an adjustment member such as a Z-axis adjusting fitting 60. Specifically, first, in a state in which light is input from the optical fiber, positioning is effected in the Z-axis direction by using the Z-axis adjusting fitting 60 movable in the Z-axis direction as illustrated in FIG. 8. Next, adjusting is effected in an X-axis direction and a Y-axis direction while sliding the optical receptacle and the Z-axis adjusting fitting 60, whereby light input from the optical fiber and passing the lens is adjusted so that the light receiving element is arranged at a maximum receiving light position. Then, those members are fixed by YAG welding.

However, in this case, the manufacturing cost therefor increases due to such a reason that the adjustment member becomes necessary.

Figure 9:
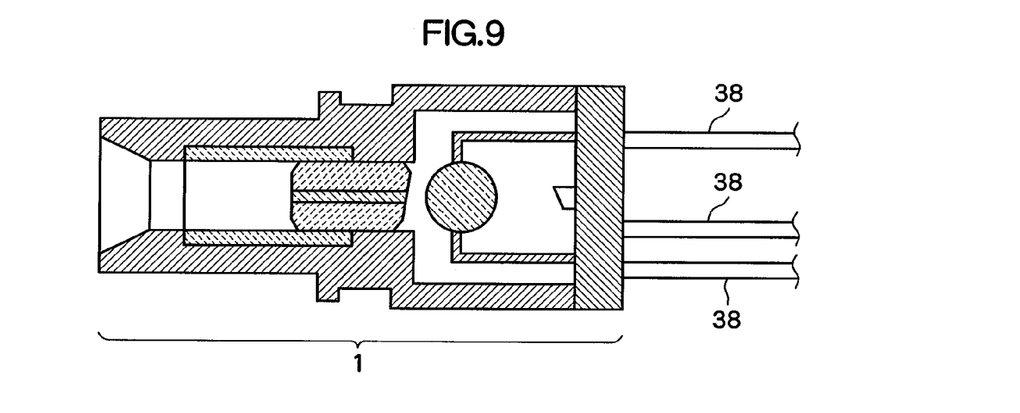
FIG. 9 is a sectional view illustrating an example of an optical module.
Figure 10:
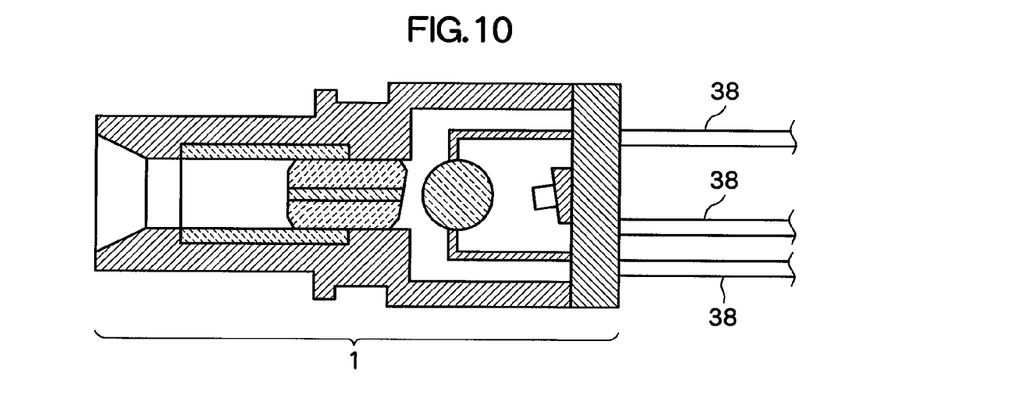
FIG. 10 is a sectional view illustrating an example of an optical module.

Note that, as illustrated in FIG. 9, it is conceivable to mount the optical module 1 so that a surface of the light receiving element is inclined. In this case, it is necessary to process the light receiving element, resulting in an increase of the manufacturing cost. Further, as illustrated in FIG. 10, it is also conceivable to mount the optical module 1 so that the light receiving element is disposed on an inclined seating. In this case, a redundant member is necessary, resulting in the manufacturing cost increase.

The present invention has been made in view of the above-mentioned problems, and it is an object of the present invention to provide an optical receptacle capable of manufacturing an optical module thereby, while suppressing a manufacturing cost, preventing a quality from degrading, and suppressing a quantity of returning light by reflection, an optical module using the optical receptacle, and a method of manufacturing an optical module.

In order to solve the above-mentioned problems, the present invention provides an optical receptacle including: a recess for receiving a lens and a lens support for supporting the lens; and a through hole penetrating from a bottom of the recess toward an exterior, into which an optical fiber is inserted from the exterior, the recess and the through hole being formed in the optical receptacle, characterized in that the recess is formed so that an inner peripheral surface of the recess is fixed to a desired position with respect to an outer peripheral surface of the lens support, in a case where the lens and the lens support are received in the recess such that an optical axis of the lens and an optical axis of the optical fiber to be inserted into the through hole are deviated from each other.

According to the present invention, the reflection light does not return to the optical fiber, thereby being capable of suppressing the quantity of returning light by reflection in the optical module. Further, the optical module may be manufactured with a small number of members, thereby being capable of suppressing the manufacturing cost. In addition, the inner peripheral surface of the recess and the outer peripheral surface of the lens support are fixed with a desired distance, thereby being capable of preventing an adhesive, which is poured into between the outer surface of the lens support and the inner surface of the optical receptacle, from localizing. As a result, it is possible to prevent the degradation of the quality of the optical receptacle and the optical module using the optical receptacle.

Further, according to an aspect of the present invention, the optical receptacle includes a resin member, in which the recess and the through hole are integrally formed. According to this aspect of the invention, the optical receptacle may be manufactured at low cost, because one mold may only be fabricated for resin molding.

Still further, according to another aspect of the present invention, the optical receptacle further includes an index, which is attached on an outer surface thereof in accordance with a position of the optical axis of the lens when the lens and the lens support are received in the recess and a position of the optical axis of the optical fiber to be inserted into the through hole formed in the optical receptacle so that the inner peripheral surface of the recess formed in the optical receptacle is fixed to the desired position with respect to the outer peripheral surface of the lens support. According to this aspect of the invention, the deviation direction of the optical axis of the lens and the optical axis of the optical fiber to be inserted into the through hole may be visually recognized. Consequently, it is possible to prevent a bonding direction error of the optical package with respect to the optical receptacle from occurring.

Yet further, according to another aspect of the present invention, the optical receptacle further includes a hole formed therein, which is different from the through hole that communicates between the recess and the exterior. According to this aspect of the invention, when fabricating the optical module by bonding the optical package and the optical receptacle, even if the optical receptacle is moved in order to adjust the position of the optical receptacle with respect to the optical package, after pouring the adhesive into between the outer surface of the lens support in the optical package and the inner surface of the optical receptacle, it is possible to prevent the quality degradation of the optical module due to generation of bubbles within the adhesive, or loss of uniformity of the adhesive.

Moreover, the present invention provides an optical module including: the optical receptacle; and an optical package, characterized in that the optical package includes: a light receiving element; a lens for collecting light output from a tip of an optical fiber to be inserted into a through hole formed in the optical receptacle to a light receiving element; and a lens support for supporting the lens.

Further, the present invention provides a method of manufacturing an optical module including: the optical receptacle; and an optical package including: a light receiving element; a lens; and a lens support for supporting the lens, the method characterized by including: adjusting a position of the optical module with respect to the optical receptacle so that light, which is output from a tip of an optical fiber and passes the lens, is collected to the light receiving element, and an inner peripheral surface of a recess is fixed to a desired position with respect to an outer peripheral surface of the lens support; and bonding the optical receptacle and the optical module at the position adjusted.

DESCRIPTION OF THE PREFERRED EMBODIMENTS

Hereinafter, an embodiment of the present invention is described in detail with reference to the drawings.

Figure 1:
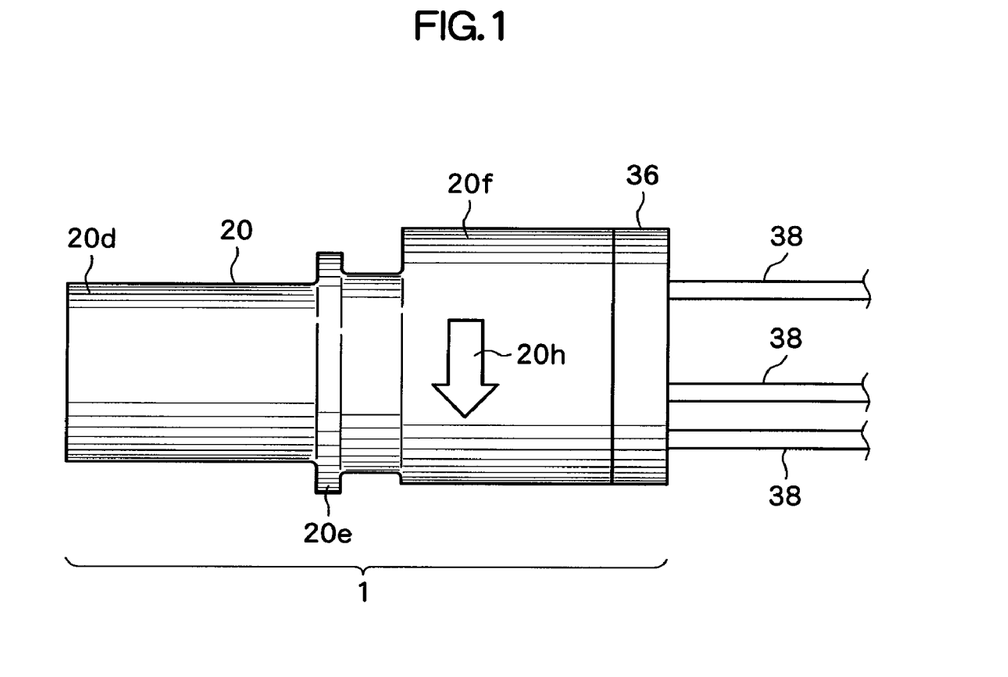
FIG. 1 is a side view of an optical module according to an embodiment of the present invention.
Figure 2:
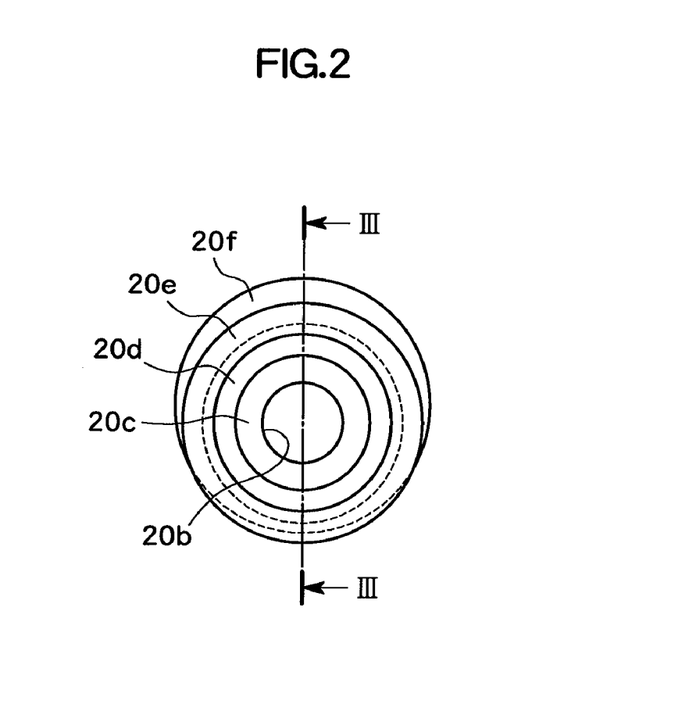
FIG. 2 is a frontal view of the optical module illustrated in FIG. 1.
Figure 3:
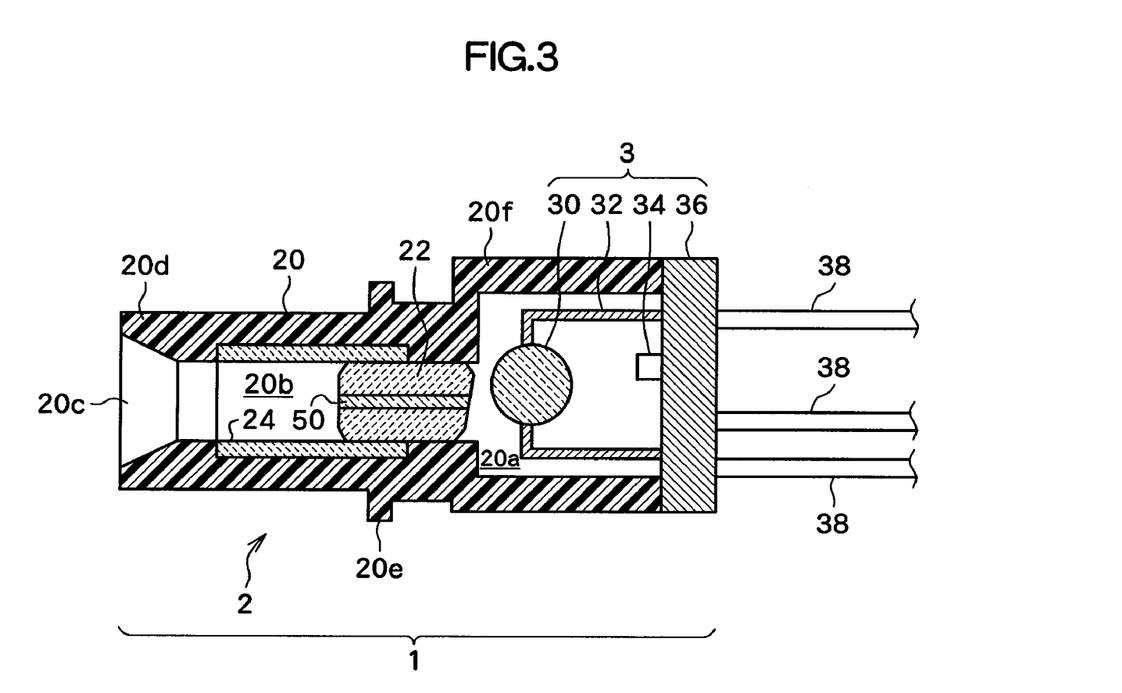
FIG. 3 is a sectional view taken along the line III-III of FIG. 2.
Figure 4:
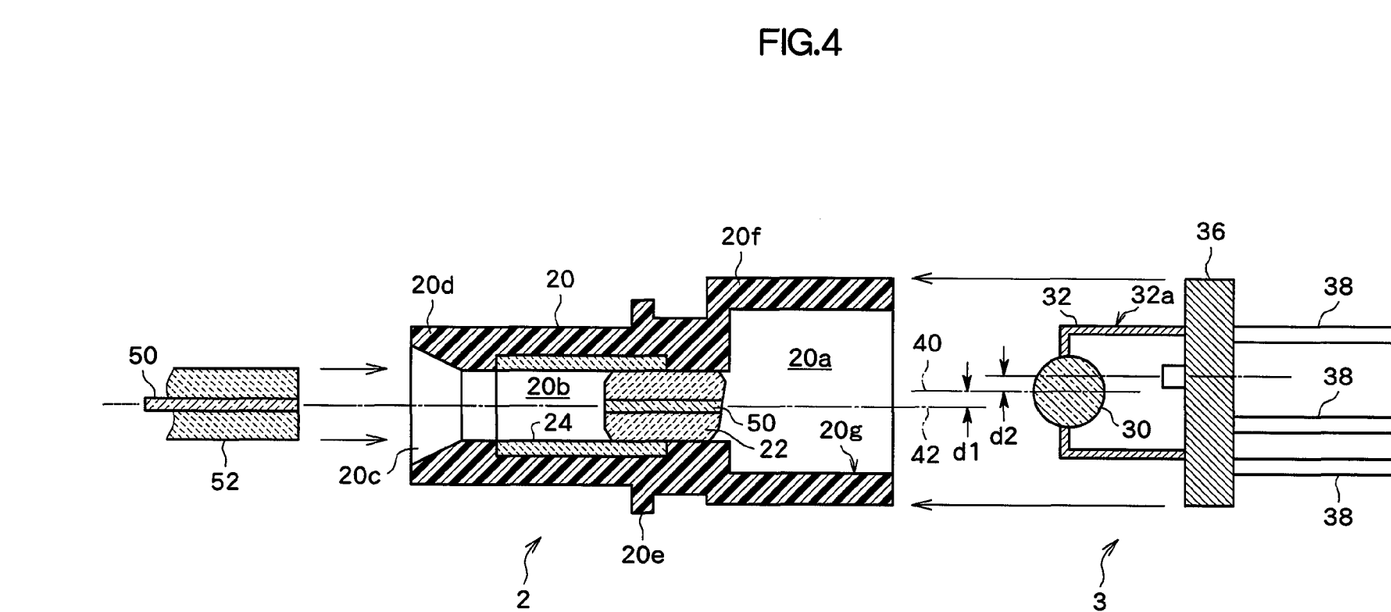
FIG. 4 is an assembling drawing of the optical module illustrated in FIGS. 1 to 3.

FIG. 1 is a side view illustrating an optical module 1 according to an embodiment of the present invention. FIG. 2 is a frontal view of the optical module 1 illustrated in FIG. 1. FIG. 3 is a sectional view taken along the line III-III of FIG. 2. FIG. 4 is an assembling drawing of an optical module 1 illustrated in FIGS. 1 to 3.

As illustrated in FIGS. 1 to 3, the optical module 1 according to this embodiment of the present invention includes an optical receptacle 2 and an optical package 3. Then, the optical receptacle 2 includes an optical receptacle main body 20, a stub 22, and a sleeve 24.

The optical receptacle main body 20 according to the embodiment of the present invention is constructed by incorporating an integrally formed resin member, and includes an optical package receiving section 20f having a cylindrical outer shape, and an optical fiber insertion section 20d having a generally cylindrical shape and having a smaller outer diameter than an outer diameter of the optical package receiving section 20f. The optical package receiving section 20f and the optical fiber insertion section 20d are coupled by respective end surfaces to each other. The optical package receiving section 20f and the optical fiber insertion section 20d are arranged so as to extend in the same direction with a predetermined distance between respective center axes to each other.

In the optical package receiving section 20f, a recess 20a having a circular shape is formed coaxially with the outer shape thereof, and the optical package receiving section 20f has a closed end cylindrical shape.

In the optical receptacle main body 20, there is formed a through-hole 20b, which extends coaxially with the outer shape of the optical fiber insertion section 20d from a tip end surface of the optical fiber insertion section 20d, and reaches to the bottom surface of the recess 20a formed in the optical package receiving section 20f. In other words, the recess 20a and the through-hole 20b penetrating from the recess 20a to the exterior are formed in the optical receptacle main body 20. The through-hole 20b has a substantially same diameter with the stub 22 and a connector 52 including an optical fiber 50.

As described above, the optical package receiving section 20f and the optical fiber insertion section 20d are arranged so that the center axes thereof are deviated to each other. The recess 20a and the through-hole 20b are formed coaxially with the optical package receiving section 20f and the optical fiber insertion section 20d, respectively. For that reason, one end of the through-hole 20b results in opening at a position deviated from the center of the bottom surface of the recess 20a.

As illustrated in FIG. 4, into the through-hole 20b, the connector 52 including the optical fiber 50 is inserted from the exterior. In this embodiment, an optical axis of the optical fiber 50 (optical fiber axis 42) and a center axis of the through-hole 20b are substantially coincide with each other. For that reason, the optical fiber axis 42 deviates from a center axis of the recess 20a.

A tapered section 20c formed at a tip end of an inner wall surface of the through-hole 20b has a taper shape that increases it diameter toward the outer side thereof. As a result, the connector 52 including the optical fiber 50 is easier to insert into the through-hole 20b.

There is formed a flange 20e along an outer periphery of the optical fiber insertion section 20d.

The stub 22 is formed by containing zirconia, or the like. Then, the stub 22 has a generally cylindrical shape and has a substantially same diameter with the through-hole 20b formed in the optical fiber insertion section 20d of the optical receptacle main body 20. The stub 22 holds the optical fiber 50, which is coaxially with the stub 22. Then, the stub 22 is insert fixed to the optical fiber insertion section 20d of the optical receptacle main body 20 by press fitting, or the like. An end surface on the right side of the stub 22 is subjected to angled-polishing. Interference between light input from the optical fiber 50 and its reflection light is prevented like this.

The side surface on the left side of the stub 22 of the optical receptacle 2 is abutted by the connector 52 including the optical fiber 50, which is inserted into the through-hole 20b from the exterior, to thereby establish a coupling between the optical fiber 50 included in the connector 52 and the optical fiber 50 held by the stub 22.

The sleeve 24 is formed by containing zirconia having elasticity, or the like. Then, the sleeve 24 has a cylindrical shape and having a substantially same diameter with the through-hole 20b. The sleeve 24 is buried in a groove formed in the inner wall surface of the optical receptacle main body 20. It is configured that position adjustment of the optical fiber 50, which is inserted into the optical fiber insertion section 20d, may be made within the through-hole 20b by using the sleeve 24.

The optical package 3 includes a spherical lens 30. Further, the optical package 3 includes a lens support 32, which is a metal made closed end cylindrical member having, formed in a bottom surface thereof, an opening having a substantially same diameter with the lens 30. The opening of the lens support 32 is coaxially formed with the bottom shape of the lens support 32. Then, the lens 30 fitted into the opening of the lens support 32. In other words, the lens support 32 supports the lens 30. For that reason, it is configured that the optical axis of the lens 30 (lens axis 40) is substantially coincide with the center axis of the lens support 32.

Besides, the optical package 3 includes the light receiving element, which is a photodiode that receives light passing through the lens 30. Further, the optical package 3 includes a stem 36, which is a metal made disk shape member, and has a substantially same diameter with the outer shape of the optical package receiving section 20f of he optical receptacle main body 20.

Then, an edge of the peripheral wall of the lens support 32 is welded on the inner surface of the stem 36 so that the center axis of the lens support 32 and a center axis of the stem 36 are formed coaxially with airtight. In other words, it is configured that the center axis of the lens axis 40 and the center axis of the stem 36 are substantially coincide with each other.

The light receiving element 34 is mounted on the inner surface of the stem 36 while deviating from the center axis of the lens support 32. In this embodiment, the center axis of the lens support 32 and the lens axis 40 are substantially coincide with each other, and hence the light receiving element 34 is disposed while deviating from an extension line of the lens axis 40 ("d2" as illustrate in FIG. 4), and mounted on the inner surface of the stem 36. The reason why the light receiving element 34 is deviated from the center axis of the lens support 32 and is mounted on the inner surface of the stem 36 is described later.

A lead line 38 is connected from an outer surface of the stem 36. Then, the lead line 38 is electrically connected to the light receiving element 34 mounted on the stem 36. The lead line 38 is configured to transmit a signal received by the optical package 3 from the lead line 38 to a communicating device (not shown).

Note that, an optical package 3 according to the embodiment of the present invention is a CAN package, but the present invention may be applied to a type other than the CAN package. Further, the lens support 32 may have another shape as long as a member supporting the lens 30.

An adhesive is poured into between the inner surface 20g of the recess 20a of the optical receptacle 2 (refer to FIG. 4) and the outer surface 32a of the lens support 32 of the optical package 3 (refer to FIG. 4), and the optical receptacle 2 and the optical package 3 is fixed by bonding, to thereby fabricate the optical module 1. In this case, the lens support 32 welded to the stem 36, the lens 30 fitted into the lens support 32, and the light receiving element 34 are formed so as to be received within the recess 20a of the optical receptacle 2. In other words, the lens 30 and the lens support 32 are received in the recess 20a of the optical receptacle main body 20. It should be noted that the bonding method for the optical receptacle 2 and the optical package 3 is not limited to the above.

As described above, the optical fiber axis 42 is formed so as to deviate with respect to the center axis of the recess 20a. Here, the center axis of the recess 20a and the lens axis 40 are substantially coincide with each other. For that reason, in the optical module 3 according to the embodiment of the present invention, the optical fiber axis 42 is configured to cause deviation ("d1" illustrated in FIG. 4) with respect to the lens axis 40.

In this case, the center axis of the recess 20a of the optical receptacle main body 20 and the center axis of the lens support 32 are substantially coincide with each other, and hence between the inner peripheral surface of the recess 20a and the outer peripheral surface of the lens support 32, there is formed a substantially uniform gap.

As can be understand from this, in a case where the lens 30 and the lens support 32 are received in the recess 20a such that the optical axis of the lens to be received in the recess 20a (lens axis 40) and the optical axis of the optical fiber 50 to be inserted into the through-hole 20b (optical fiber axis 42) are deviated with each other, the recess 20a of the optical receptacle 2 according to the embodiment of the present invention is formed so that the inner peripheral surface of the recess 20a is fixed to a desired position with respect to the outer peripheral surface of the lens support 32.

Here, it is required for the light receiving element 34 to be configured to receive the light passing through the optical fiber 50 included in the connector 52, the optical fiber 50 held by the stub 22, and the lens 30. For that reason, it is required for the light receiving element 34 to be disposed while being deviated from the lens axis 40.

About a relation between the deviation of the optical fiber axis 42 from the lens axis 40 and the deviation of the light receiving element 34 from the lens axis 40 is analytically determined as described below by using a ray matrix of the lens.

Figure 5:
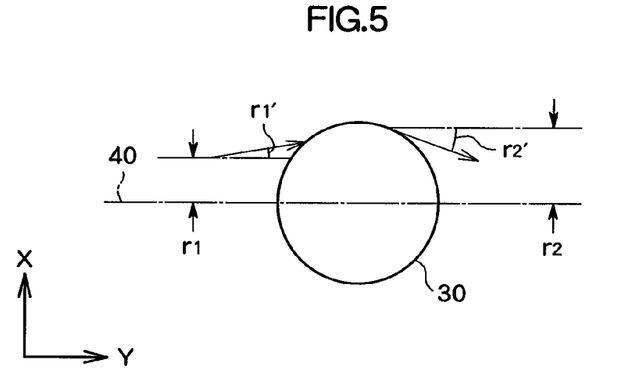
FIG. 5 is an illustration of a coordinate of a light beam entering into a lens and a light beam outputting from the lens.

As illustrated in FIG. 5, in a case where the lens axis 40 is plotted on a Z axis, and a vertical direction thereto is plotted on an X axis, the ray is expressed by a height $r1$ and a tilt angle r1' with respect to the lens axis 40. This case is expressed by coordinates (r1, r1'). If the coordinates when the ray enters the lens are expressed by (r1, r1'), the coordinates (r2, r2') of output ray after passing the lens may be determined by the following Equation (1). Note that, d0 in Equation (1) is a distance from a center of the lens 30 to an output end of the optical fiber, d1 is a distance from the center of the lens 30 to a surface of the light receiving element 34, and f represents a focus distance of the lens 30.

[Equation 1]

$$\begin{pmatrix} r_2 \\ r'_2 \end{pmatrix} = \begin{pmatrix} 1 - \frac{d_1}{f} & d_0 - d_1\left(1 - \frac{d_0}{f}\right) \\ -\frac{1}{f} & 1 - \frac{d_0}{f} \end{pmatrix} \begin{pmatrix} r_1 \\ r'_1 \end{pmatrix} \quad (1)$$

In a case of an optical system, in which the focus distance f is sufficiently larger than a ray spot size, among f, d0, and d1, a relation expressed by the following Equation (2) is established.

[Equation 2]

$$\frac{1}{d_0} + \frac{1}{d_1} = \frac{1}{f} \quad (2)$$

In the optical system according to the embodiment of the present invention, a core diameter of the optical fiber 50 corresponds to the ray spot size. The core diameter of the optical fiber 50 in a single mode fiber (mode field diameter) is about 10 μm. The core diameter of the optical fiber 50 in multi mode fiber is about 62.5 μm. Ordinarily, the focus distance of the lens 30 is about 1 to 1.5 mm. For that reason, in this embodiment, the focus distance of the lens 30 may be said as being sufficiently large with respect to the ray spot size. Consequently, the relation represented by Equation (2) is established in this embodiment.

The ray spot size ratio between before entering into the lens and after outputting from the lens is referred to an image magnification factor. The relation expressed by the following Equation (3) is established among the image magnification factor m, d0, and d1.

[Equation 3]

$$m = \frac{d_1}{d_0} \quad (3)$$

Equation (1) described above may be rewritten as expressed by the following Equation (4) by using the image magnification factor m.

[Equation 4]

$$\begin{pmatrix} r_2 \\ r'_2 \end{pmatrix} = \begin{pmatrix} -m & 0 \\ -\frac{1}{f} & -\frac{1}{m} \end{pmatrix} \begin{pmatrix} r_1 \\ r'_1 \end{pmatrix} \quad (4)$$

Here, if the optical fiber axis 42 and the lens axis 40 are configured in parallel with each other, deviation of angle of the input ray does not occur. That is, r1'=0 is established. In this case, coordinates (r2, r2') are represented by the following Equation (5).

[Equation 5]

$$\begin{pmatrix} r_2 \\ r'_2 \end{pmatrix} = \begin{pmatrix} -mr_1 \\ -\frac{1}{f}r'_1 \end{pmatrix} \quad (5)$$

Therefore, as represented by Equation (5), the coordinates (r2, r2') are the coordinates which become a maximum light receiving position of the light receiving element 34, and hence it is better that the optical package 3 be fabricated so that the light receiving element 34 is disposed at the position. Besides, if m=1 is established, it is better that the optical package 3 be fabricated so that the light receiving element 34 is disposed at a position which is deviated in a direction opposite to the deviation direction of the optical fiber axis 42 by a distance covering the distance in which the optical fiber axis 42 is deviated from the lens axis 40.

Here, if the lens 30 is spherical, the focus distance may be represented by the following Equation (6). Note that, in this case, a radius of the lens 30 is represented by R, a refractive index of the lens is represented by n, and the lens 30 is assumed to be disposed under vacuum.

[Equation 6]

$$f = \frac{nR}{2(n-1)} \quad (6)$$

If the lens 30 of R=1 mm and n=1.5 is used, f=1.5 mm is established. Here, if the image magnification factor m=1 is established, namely, in a case where the input ray spot size and the output ray spot size are the same, if taking a case where the optical fiber axis 42 is deviated from the lens axis 40 by 0.1 mm, r2=−0.1 mm and r2'=3.8° are established. Specifically, it is better that the light receiving element 34 be disposed at a position in a direction opposite to the deviation direction of the optical fiber axis 42 with respect to the lens axis 40 by a distance covering the same distance in which the optical fiber axis 42 is deviated with respect to the lens axis 40. In this case, the ray enters to the light receiving element 34 with an angle of 3.8° with respect to a normal line which is vertical to a surface of the light receiving element. That is, the input angle becomes 3.8°. Besides, in this case, a reflection angle on the light receiving element 34 also becomes 3.8°. For that reason, the reflection light does not return to the optical fiber 50, thereby being capable of suppressing the quantity of returning light by reflection.

Even in a case where the radius and the refractive index of the lens 30 are different from the radius and the refractive index of the above-mentioned lens 30, as in a case of R=0.75 mm, n=1.77, or the like, the reflection light does not return to the optical fiber 50. For that reason, it is possible to suppress the quantity of returning light by reflection in the optical module 1. Further, even if the lens 30 is a ball lens, an aspheric lens, a Selfoc lens, or the like, it is possible to suppress the quantity of returning light by reflection in the optical module 1.

As can be understood from Equation (5), a position on which the light receiving element 34 is to be mounted is determined by the image magnification m. While in the above-mentioned equation, there is described a case in which the image magnification m=1 is established. However, even in a case of the image magnification m of a different value, it is possible to suppress the quantity of returning light by reflection in the optical module 1.

As can be understood from the above description, a deviation between the lens axis 40 and the optical fiber axis 42 corresponds to a deviation of the light receiving element 34 from the lens axis 40. For that reason, it is possible to fabricate the optical package 3 mounting the light receiving element 34 at a position corresponding to the optical receptacle 2 according to the embodiment of the present invention and the optical module 1 using the optical package 3.

In other words, the manufacturing step for the optical package 3 contained in the optical module 1 according to this embodiment may include a step of fixing the light receiving element 34 to a position at which the light output from a tip end of the optical fiber 50 and passing the lens 30 is condensed, when the position of the optical module 1 with respect to the optical receptacle 2 is adjusted so that an inner peripheral surface of the recess 20a and an outer peripheral surface of the lens support 32 are fixed at a desired distance from each other.

Further, when the mounting position of the light receiving element 34 on the stem 36 is set in advance, in accordance with the above-mentioned Equation (5), on the basis of mounting position of the light receiving element 34 on the stem 36, the deviation between the lens axis 40 and the optical fiber axis 42 may be determined. Therefore, it is possible to fabricate the optical receptacle 2 based on the deviation and the optical module 1 using the optical receptacle 2. Specifically, the manufacturing step for the optical receptacle 2 contained in the optical module 1 according to this embodiment of the present invention may include the step of forming the through-hole 20b into which the optical fiber 50 is inserted so that the light input from the tip end thereof passes through the lens 30 to be collected on the light receiving element 34.

In this way, the light receiving element 34 receives the light from the optical fiber 50 included in the connector 52 via the optical fiber 50 included in the stub 22 and the lens 30. In other words, the lens 30 collects on the light receiving element 34 the light output from the tip end of the optical fiber 50 which is inserted from the exterior into the through-hole 20b formed in the optical receptacle main body 20.

In order that the light receiving element 34 receives the light from the optical fiber 50, it is necessary to determine the position of the optical package 3 with respect to the optical receptacle 2. Here, when the deviation between the lens axis 40 and the optical fiber axis 42 is small (for example, about 0.1 mm), it is difficult to visually recognize the deviation.

Then, as illustrated in FIG. 1, in the optical receptacle 2 according to the embodiment of the present invention, an index 20h is put on the outer surface of the optical receptacle 2, whereby enabling the visual recognition of the deviation.

Specifically, for example, on a plane surface including the lens axis 40 and the optical fiber axis 42 parallel to the lens axis 40, there is put, along the outer surface of the optical receptacle 2, the index 20h (arrow in this embodiment) indicating a direction corresponding to the direction of the vertical line drawn from a point on the lens axis 40 to the optical fiber axis 42.

The index 20h may be formed as, for example, a recessed engrave in the optical receptacle 2. The recessed engrave may be molded in a die for resin molding. As a result, the optical receptacle 2 as descried above may be fabricated at low cost.

In this manner, in order that the inner peripheral surface of the recess 20a formed in the optical receptacle 2 is fixed at the desired position with respect to the outer peripheral surface of the lens support 32, it is attached, on the exterior (for example, outer surface) of the optical receptacle 2 according to the embodiment of the present invention, that the index 20h corresponding to the position of the lens axis 40 and the position of the optical fiber axis 42 when the lens 30 and the lens support 32 are received in the recess 20a.

When the index 20h indicating the direction in which the optical fiber axis 42 deviates with respect to the lens axis 40 is attached on the optical receptacle 2, it is possible to visually recognize the direction to bond the optical receptacle 2 and the optical module 1. Therefore, it is possible to prevent an error in direction of bonding the optical package 3 with respect to the optical receptacle 2 according to the embodiment of the present invention.

Note that, the shape of the index 20h is not limited to an arrow shape as illustrated in FIG. 5. The index 20h may be formed into a shape other than the arrow. Specifically, the direction indicated by the index 20h may be depicted by a circle, a polygon, a character, and the like. Further, the index 20h may not be formed by the recessed chase, and may be formed by a convex roll, groove, hole, and the like. Further, the index 20h may be attached at the other positions capable of visually recognizing the deviation direction of the optical fiber axis 42 with respect to the lens axis 40.

Note that, of course, the optical receptacle 2 may not be provided with the index 20h as illustrated in FIG. 1.

As can be understand from the above-mentioned description, the manufacturing method for the optical module 1 according to the present invention may include a step of adjusting the position of the optical module 1 with respect to the optical receptacle 2, such that the light which is output from the tip end of the optical fiber 50 and passes through the lens 30 is collected on the light receiving element 34, and that the inner peripheral surface of the recess 20a and the outer peripheral surface of the lens support 32 are set at the desired position, and a step of bonding the optical receptacle 2 and the optical module 1 at the adjusted position.

The above-mentioned optical receptacle 2 according to the embodiment of the present invention may be manufactured by a small number of members. Therefore, the manufacturing cost may be reduced. Further, the distance between the inner peripheral surface of the recess 20a and the outer peripheral surface of the lens support 32 may be set at the desired distance. Specifically, for example, an approximately uniform gap is generated between the inner peripheral surface of the recess 20a and the outer peripheral surface of the lens support 32. Therefore, it is possible to prevent the deterioration in quality of the optical receptacle 2 and the optical module 1 using the optical receptacle 2 due to the non-uniformity of the adhesive poured into between the outer surface of the lens support 32 and the inner surface of the optical receptacle 2. Further, the reflection light does not return to the optical fiber 50, and hence the quantity of returning light by reflection in the optical module 1 may be suppressed.

Further, as described above, the optical receptacle 2 includes the resin component integrally formed with the recess 20a and the through-hole 20b. Labor hour of cutting work is required in manufacturing by metal the optical receptacle 2 having an entire shape of rotation asymmetry like the optical receptacle 2 according to the embodiment of the present invention. On the other hand, when manufacturing by a resin the optical receptacle 2 having an entire shape of rotation asymmetry like the optical receptacle 2 according to the embodiment of the present invention, it is possible to mass-produce the optical receptacle 2 by once manufacturing a resin molding die. Further, improvement in machining accuracy may be expected. Note that, of course, the optical receptacle 2 may not always include the resin component integrally formed with the recess 20a and the through-hole 20b.

It should be noted that the present invention is not limited to the above-mentioned embodiment.

Figure 6:
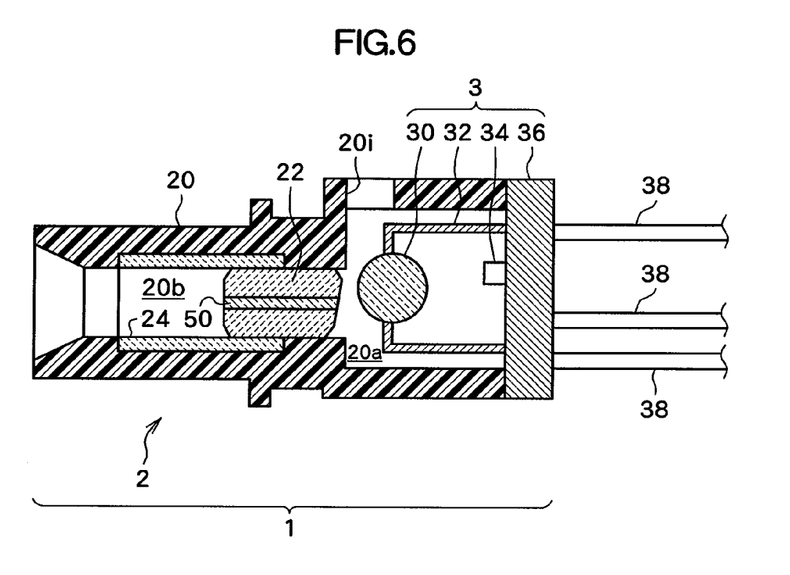
FIG. 6 is a sectional view illustrating the optical module according to the embodiment of the present invention.

For example, as illustrated in FIG. 6, a hole 20i different from the through-hole 20b, which is brought in connect with the exterior and the recess 20a may be formed in the optical receptacle 2. Specifically, for example, the hole 20i penetrating from the inner surface 20g of the recess 20a to the exterior may be formed in the optical receptacle 2. In this case, the hole 20i may be formed in a direction perpendicular to the inner surface 20g.

In bonding the optical package 3 and the optical receptacle 2, after pouring the adhesive into between the outer surface of the lens support 32 and the inner surface of the optical receptacle 2, when moving the optical receptacle 2 for the purpose of adjusting the position of the optical receptacle 2 with respect to the optical package 3, air trapped between the stub 22 and the adhesive presses the adhesive.

As a result, there is a fear of generating air bubbles in the adhesive and deteriorating the uniformity of the adhesive. There is a fear in that this leads to the quality degradation of the optical module 1. As illustrated in FIG. 6, when the hole 20i penetrating from the inner surface 20g of the recess 20a to the exterior thereof is provided to the optical receptacle 2, the air is not trapped between the stub 22 and the adhesive. Therefore, it is possible to prevent the degradation of the quality of the optical module 1.

The hole 20i may be formed between a space into which the adhesive is poured and the stub 22. In this manner, it is possible to prevent the adhesive from entering the hole 20i and the hole 20i from being sealed. Note that, the hole 20i may of any shape including a circle, a polygon, and the like.

Note that, the optical receptacle 2 according to the embodiment of the present invention may be applied to the optical module 1 including an adjustment member such as a Z-axis adjustment fitting 60 such as being illustrated in FIG. 8.

Further, in a case where the optical receptacle 2 is formed such that the lens axis 40 and the optical fiber axis 42 are deviated from each other, and when the lens 30 and the lens support 32 are received in the recess 20a such that the lens axis received in the recess 20a (the lens axis 40) and the lens axis of the optical fiber received in the through-hole 20b (optical fiber axis 42) are deviated from each other, as long as the inner surface of the recess 20a is set at the desired position with respect to the outer peripheral surface of the lens support 32, the shape of the optical package insertion section 20f and the optical fiber insertion section 20d are not limited to the shape described in this embodiment.

It should be noted that specific numerical values presented in the above-mentioned description are examples, and are not limited thereto.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical receptacle which is configured to abut an optical package which comprises a disk-shaped stem, a lens support which is formed on an inner surface of the stem, a lens which is supported by the lens support, and a light-receiving element which is contained in the lens support, comprising:

a main body having a recess for receiving the lens and the lens support, and a through hole penetrating from a bottom of the recess toward an exterior and configured for an optical fiber to be inserted therethrough from the exterior, the recess and the through hole being in direct communication with each other, wherein the through hole is configured so that an optical axis of the inserted optical fiber and a center axis of the through hole are substantially collinear, the recess is formed so that the inserted lens is disposed on the center axis of the recess, one end of the through hole of the main body opens at a position deviated from the center of the bottom surface of the recess so that light output from a tip of the inserted optical fiber and passing the lens is collected to the light receiving element when the optical receptacle is abutted by the optical package, a substantially uniform gap is formed between an inner peripheral surface of the recess and an outer peripheral surface of the lens support when the optical receptacle is abutted by the optical package, and an opening end surface of the recess formed in the main body is configured to be in abutment with the inner surface of the stem.

2. An optical receptacle according to claim 1, wherein the main body of the optical receptacle is a resin component.

3. An optical receptacle according to claim 1, further comprising an index, which is provided on an outer surface thereof in accordance with the direction from the center axis of the recess formed in the main body to the center axis of the through hole formed in the main body.

4. An optical receptacle according to claim 1, further comprising a stub, fixed within the through hole of the main body, which supports the inserted optical fiber, and a hole formed therein, which is different from the through hole that communicates between the recess and the exterior, configured for evacuating air trapped between an adhesive, which is provided between the outer surface of the lens support and the inner surface formed in the main body, and the stub when the optical package and the optical receptacle are bonded by the adhesive.

5. An optical module comprising:

the optical receptacle according to claim 1; and an optical package which comprises a disk-shaped stem, a lens support which is formed on an inner surface of the stem, a lens which is supported by the lens support, and a light-receiving element which is contained in the lens support.

6. A method of manufacturing an optical module comprising: the optical receptacle according to claim 1; and an optical package a disk-shaped stem, a lens support which is formed on an inner surface of the stem, a lens which is supported by the lens support, and a light-receiving element which is contained in the lens support, the method comprising:

adjusting a position of the optical package with respect to the optical receptacle so that a substantially uniform gap is formed between the inner peripheral surface of the recess and the outer peripheral surface of the lens support; and bonding the optical receptacle and the optical module at the position adjusted.

7. An optical module comprising:

an optical fiber having a core;

an optical package having a light receiving element, a lens configured to collect light from the optical fiber to the light receiving element, and a lens support configured to support the lens, the optical package having a first cylindrical outer portion and a first cylindrical axis; and
an optical receptacle having a recess into which the optical package is inserted and a through hole into which the optical fiber is inserted,
wherein the recess has a second cylindrical cavity and a second cylindrical axis,
wherein the through hole has a third cylindrical cavity and a third cylindrical axis substantially aligned with the core of the optical fiber,
wherein both of the first and second cylindrical axes are substantially aligned with an optical axis of the lens, and
wherein the third cylindrical axis of the through hole is aligned with the second cylindrical axis of the recess with an offset.

8. An optical module according to claim 7, wherein the first cylindrical outer portion of the optical package has a diameter that is substantially the same as the inner diameter of the second cylindrical cavity of the recess, but sufficiently smaller than the inner diameter to permit insertion of the optical package in the second cylindrical cavity.

* * * * *